(12) United States Patent
Alverson et al.

(10) Patent No.: US 7,984,453 B2
(45) Date of Patent: Jul. 19, 2011

(54) EVENT NOTIFICATIONS RELATING TO SYSTEM FAILURES IN SCALABLE SYSTEMS

(75) Inventors: Gail A. Alverson, Seattle, WA (US);
Robert L. Alverson, Seattle, WA (US);
Daniel C. Duval, Lincoln City, OR (US); Eric A. Hoffman, Seattle, WA (US); Laurence S. Kaplan, Seattle, WA (US); Matthew Kelly, Eau Claire, WI (US); Kazuya Okubo, Seattle, WA (US); Mark Swan, Prescott, WI (US); Asaph Zemach, Seattle, WA (US)

(73) Assignee: Cray Inc., Seattle, WA (US)

( * ) Notice: Subject to any disclaimer, the term of this patent is extended or adjusted under 35 U.S.C. 154(b) by 910 days.

(21) Appl. No.: 11/857,261

(22) Filed: Sep. 18, 2007

(65) Prior Publication Data

US 2008/0134213 A1    Jun. 5, 2008

Related U.S. Application Data

(63) Continuation-in-part of application No. 11/825,618, filed on Jul. 5, 2007, now abandoned, which is a continuation of application No. 11/600,339, filed on Nov. 14, 2006, now abandoned, which is a continuation of application No. 11/439,382, filed on May 22, 2006, now abandoned, which is a continuation of application No. 11/358,931, filed on Feb. 21, 2006, now abandoned, which is a continuation of application No. 11/172,460, filed on Jun. 30, 2005, now abandoned, which is a continuation of application No. 10/992,504, filed on Nov. 18, 2004, now abandoned.

(60) Provisional application No. 60/523,256, filed on Nov. 19, 2003, provisional application No. 60/523,361, filed on Nov. 19, 2003, provisional application No. 60/523,241, filed on Nov. 19, 2003.

(51) Int. Cl.
*G06F 13/00* (2006.01)
*G06F 11/00* (2006.01)

(52) U.S. Cl. ..................................... 719/318; 714/48
(58) Field of Classification Search .................. None
See application file for complete search history.

(56) References Cited

U.S. PATENT DOCUMENTS 6,772,418 B1 * 8/2004 Morris ..................... 719/318
7,093,034 B2 * 8/2006 Need ........................ 710/33
7,433,979 B2 * 10/2008 Need ........................ 710/33

* cited by examiner

*Primary Examiner* — Qing Wu
(74) *Attorney, Agent, or Firm* — Perkins Coie LLP (57) ABSTRACT

An availability system is provided that includes a hierarchy of controllers for providing event notifications relating to availability of components of a scalable MPP system. A controller receives a subscription from a child controller that identifies an event type and a generator. The controller stores in a subscription store an indication that the subscription has been received from the child controller. When a parent controller has not yet been notified of a subscription with a matching event type and generator as indicated by the subscription store, the controller sends the subscription to the parent controller. When the parent controller has already been notified of a subscription with a matching event type and generator as indicated by the subscription store, the controller suppresses the sending of the subscription to the parent controller.

25 Claims, 6 Drawing Sheets

EVENT NOTIFICATIONS RELATING TO SYSTEM FAILURES IN SCALABLE SYSTEMS

CROSS-REFERENCE TO RELATED APPLICATIONS

The present application is a continuation-in-part of U.S. patent application Ser. No. 11/825,618 filed Jul. 5, 2007 (now abandoned), which is a continuation application of U.S. patent application Ser. No. 11/600,339, filed Nov. 14, 2006 (now abandoned), which is a continuation application of U.S. patent application Ser. No. 11/439,382, filed May 22, 2006 (now abandoned), which is a continuation application of U.S. patent application Ser. No. 11/358,931, filed Feb. 21, 2006 (now abandoned), which is a continuation application of U.S. patent application Ser. No. 11/172,460, filed Jun. 30, 2005 (now abandoned), which is a continuation of U.S. patent application Ser. No. 10/992,504, entitled "METHOD AND SYSTEM FOR DEMULTIPLEXING PACKETS USING A CONTENT ADDRESSABLE MEMORY," filed Nov. 18, 2004 (now abandoned), which claims priority to U.S. Provisional Applications No. 60/523,256, entitled "MASSIVELY PARALLEL PROCESSING SUPERCOMPUTER," filed Nov. 19, 2003; No. 60/523,361, entitled "MESSAGE ROUTING UNIT," filed Nov. 19, 2003, and No. 60/523,241, entitled "RESILIENCY COMMUNICATIONS ARCHITECTURE," filed Nov. 19, 2003, all of which are incorporated herein in their entireties by reference.

BACKGROUND

Massively parallel processing ("MPP") systems may have tens of thousands of nodes connected via a communications mechanism. Each node may include a processor (e.g., an AMD Opteron processor), memory (e.g., between 1-8 gigabytes), a communications interface (e.g., HyperTransport technology), and a router with routing ports. Each router may be connected to some number of routers and then to other nodes via their routing ports to form a routing topology (e.g., torus, hypercube, and fat tree) that is the primary system network interconnect. Each router may include a routing table specifying how to route incoming packets from a source node to a destination node. The nodes may be organized into modules (e.g., a board) with a certain number (e.g., 4) of nodes each, and the modules may be organized into cabinets with multiple (e.g., 64) modules in each cabinet. Such systems may be considered scalable when an increase in the number of nodes results in a proportional increase in their computational capacity.

The nodes of an MPP system may be designated as service nodes or compute nodes. Compute nodes are primarily used to perform computations. A service node may be dedicated to providing operating system and programming environment services (e.g., file systems, external I/O, compilation, editing, etc.) to application programs executing on the compute nodes and to users logged in to the service nodes. The operating system services may include I/O services (e.g., access to mass storage), processor allocation services, log in capabilities, and so on. The service nodes and compute nodes may employ different operating systems that are customized to support the processing performed by the node.

MPP systems may be susceptible to many different types of hardware and software failures. Each of the thousands of nodes may have many different hardware components that may fail including processors, memory, routers, cooling systems, power supplies, physical connections, disk drives, and so on. In addition, the operating system and other system services executing on each node may have various software components that may fail including message handlers, monitors, memory allocators, and so on.

Because MPP systems have thousands of nodes with many different possible points of failure, it is likely failures would not be uncommon. If an MPP system could effectively detect failures, it may be able to take appropriate remedial action to mitigate the effect of the failure. For example, if the processor of a compute node fails while executing a certain task of an application program, the processor allocation service of the operating system may select another compute node and restart execution of the task on the new compute node. As another example, if a connection between two routers breaks, the operating system may adjust the routing tables of the routers to bypass the break.

Extensive message passing between the nodes of an MPP system is typically needed to monitor failures. Such message passing for the purpose of monitoring failures, however, may place an unacceptably high burden on the primary system network interconnect. As a result of this burden, the performance of the application programs executing on the compute node and the system services provided by the service nodes may be significantly diminished.

DETAILED DESCRIPTION

A method and system for providing event notifications relating to availability of components within a multiprocessor system is provided. In some embodiments, an availability system comprises a hierarchy of controllers for monitoring the availability of components of the multiprocessor system. At the lowest level of the hierarchy, the availability system may include a controller for each node that is implemented as software that executes on the node. At the next lowest level of the hierarchy, the availability system may include a controller for each module that may be implemented as software that executes on special-purpose controller hardware. At the next lowest level of the hierarchy, the availability system may include a controller for each cabinet that also may be implemented in software that executes on special-purpose controller hardware. The availability system may then include other levels of controllers for groups of cabinets referred to as slices, groups of slices referred to as sections, and so on. At the top of the hierarchy is a controller designated as the system management workstation, which provides a view of the overall availability of the components of the multiprocessor system. The hierarchy of controllers forms a tree organization with the system management workstation being the root controller and the controllers of the nodes being the leaf controllers. Each controller communicates between its parent and child controller using an availability communication network that is independent of (or out-of-band from) the primary system network interconnect. For example, the availability communication network may be a high-speed Ethernet network. Since the availability system uses a communication network that is independent of the primary system network interconnect, the availability system will not directly affect the performance of application programs that pass messages via the primary system network interconnect.

The primary function of the controllers is monitoring their own availability, the availability of their child controllers, and the availability of any associated hardware. A leaf controller (or node controller or resiliency communication agent) may monitor the availability of the hardware components of the node and the system services executing on the node. The next higher level controller (or module controller or L0 controller) may monitor the availability of the leaf controllers of the nodes of the module, power to the module, and so on. The next higher level controller (or cabinet controller or L1 controller) may monitor the availability of the next lower level controllers, power to the cabinet, cooling of the cabinet, and so on. An L1 controller may be a leaf controller in some instances, such as when it is monitoring a disk drive or other component that is not a node.

The controllers communicate system availability information using event notifications. When a controller detects a failure, it sends an event notification to its parent controller, which in turn forwards the event notification to its parent controller. Eventually, the root controller receives and logs the event notification. The root controller also distributes the event notifications to those controllers and system services that are responsible for handling the specific event so that they are appropriately notified. Rather than sending an event notification to every controller for distribution to each controller and system service, the availability system uses a publisher and subscriber model to ensure that event notifications need only be sent to controllers and system services that are truly interested in the event notification. Each controller and system service interested in receiving an event notification of a certain type from a certain source (or publisher) sends a subscription request to its parent controller. A subscription request includes the type of subscription of interest and a specification of the source or sources of interest. The sources of interest may be specified by a "generator." The availability system compares the source of an event notification to the generator to determine whether the subscriber is interested in the event notification. The event types may include various failure conditions such as failure of a cooling system, failure of a system service, failure of a controller, and so on. The event type may also include non-failure conditions such as memory nearly full conditions, temperature high conditions, and so on.

To reduce the message passing needed to support both subscription requests and event notifications, each controller aggregates subscription requests and filters event notifications. A controller aggregates subscription requests by maintaining a table with a list of subscription requests that it has submitted to its parent. If the controller receives a subscription request from its child controller (or system service) that it is monitoring that is not the same (i.e., different event type or different generator) as one already in its subscription store, it adds the subscription request to the store and forwards the subscription request to its parent controller. If, however, the subscription request is the same (i.e., same type and same generator) as one already in its subscription store, it updates the store to add an indication of the subscribing child controller but suppresses the sending of the subscription request to its parent controller. Since the parent controller already received the same subscription request generated from the prior subscribing child controller, the controller is already appropriately subscribed. Aggregation of subscription requests reduces the number of subscription requests that need to be forwarded up the controller hierarchy.

When an event does occur, an event notification is generated by the source and sent to its parent controller. Each controller that receives an event notification from a child controller forwards the event notification to its parent controller. The top controller, upon receiving an event notification, sends that event notification to each subscribing child controller as indicated by its subscription store. When a controller receives an event notification from its parent controller, it filters the event notification by sending the event notification only to each of its child controllers that has subscribed to that event notification as indicated by its subscription store. This results in the event notifications being distributed to only the subscribers and their ancestor controllers. The availability system may allow a controller that receives an event notification from a child controller to directly send the event notification to each of its other child controllers that has subscribed to that event notification. In this way, sibling controllers of a child controller will receive an event notification without having to wait for it to be propagated up and then down the hierarchy. Also, event notifications do not need to be sent to the controller from which it was received as that controller will have already sent the event notifications to its child controllers. The filtering of event notifications and the direct sending to sibling controllers reduces the number of event notifications that are sent down the controller hierarchy.

The availability system may use heartbeats to track the availability of controllers and system services. Each child controller periodically sends a heartbeat notification to its parent controller. If a parent controller does not receive a heartbeat notification from a child controller within the designated period, the parent controller assumes that the child controller has failed and sends a corresponding event notification.

A node controller may monitor the availability of system services that execute on the node and support subscriptions and event notifications for those system services. Upon startup, each system service may register with the node controller to have its availability monitored based on sending a periodic heartbeat notification. The heartbeat notification may be the sending of a message to the process in which the node controller executes, the incrementing of a location in memory, and so on. To register, a system service opens a node controller device and provides an indication of whether it will be providing a heartbeat and at what frequency. The service may also ask a separate component to restart it if it fails. The node controller monitors the heartbeat notification. If it does not detect a heartbeat notification for the indicated heartbeat period, the node controller forwards an event notification reporting the failure of the system service. The node controller may also optionally restart the system service. The node controller may also receive from the system services subscription requests for event notifications and receive event notifications from the system services reporting on various types of events.

A node controller may also monitor the availability of a system service based on detecting when the process executing the system service terminates. Upon startup, a system service may register with the node controller to have its availability monitored based on termination of its process (rather than or in addition to using a heart beat). To effect the monitoring, the system service relies on the opening of a device driver of the node controller as described above. If the process of the system service then terminates, the device driver is notified that the system service has closed the device driver (e.g., via standard Unix functionality). In such a case, the node controller becomes aware of the failure and can take the appropriate action as described above.

Figure 1:
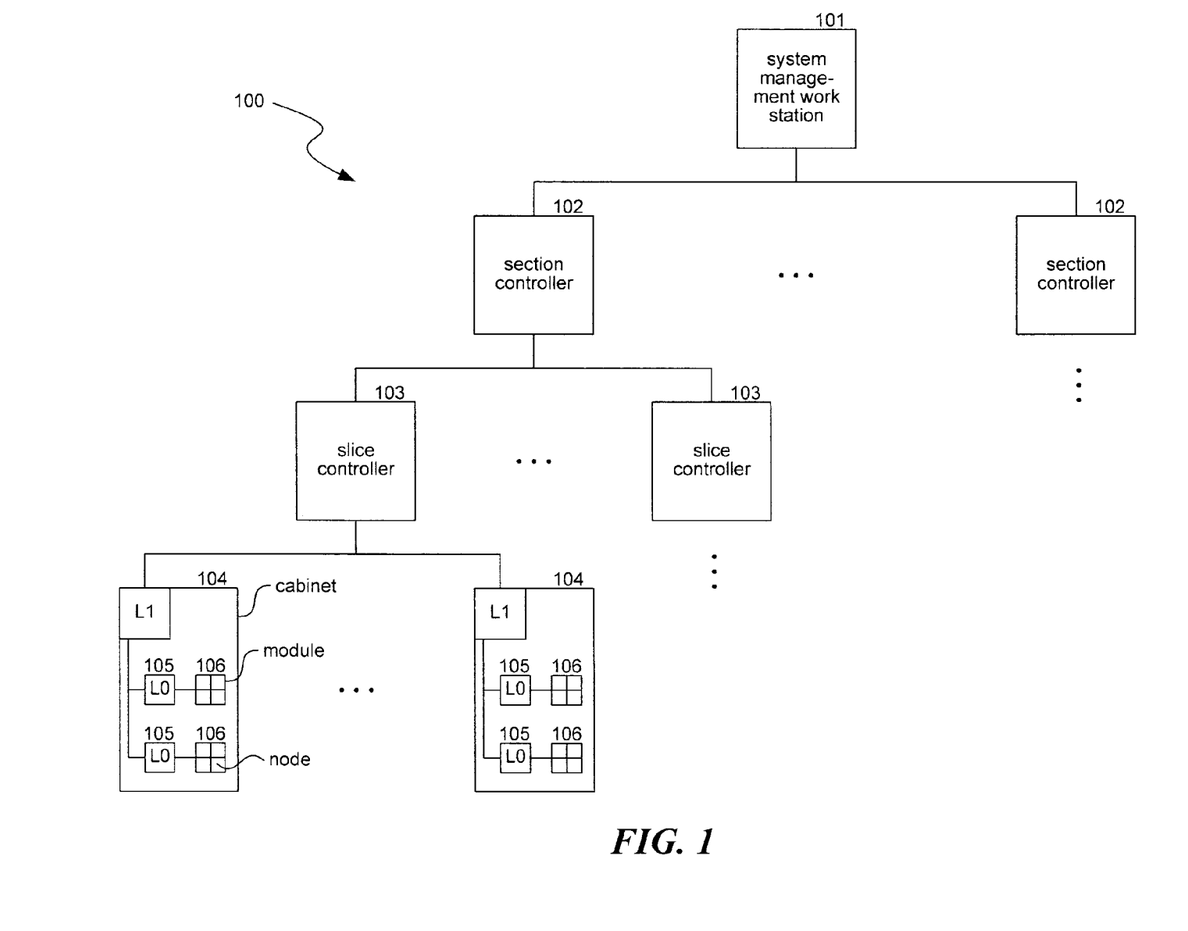
FIG. 1 is a block diagram that illustrates a controller hierarchy of the availability system in some embodiments.

FIG. 1 is a block diagram that illustrates a controller hierarchy of the availability system in some embodiments. The controller hierarchy 100 includes a root controller 101, referred to as a system management workstation. The root controller is the parent controller for the section controllers 102. A section is a grouping of slices. Each section controller is a parent controller of slice controllers 103. A slice is a grouping of cabinets. Each slice controller is a parent controller of cabinet controllers 104. A cabinet physically contains the modules. Each cabinet controller is a parent controller of module controllers 105 within the cabinet. A module is a physical grouping of a number (e.g., four) of nodes. Each module controller is a parent controller of node controllers 106 on a module. The lines between the controllers represent the logical communications path between the controllers, which may be implemented as an availability communications network that is out-of-band from the primary system network interconnect, which is not shown in FIG. 1.

The computing device on which the availability system may be implemented may include a central processing unit and memory and may include, particularly in the case of the root controller, input devices (e.g., keyboard and pointing devices), output devices (e.g., display devices), and storage devices (e.g., disk drives). The memory and storage devices are computer-readable media that may be encoded with computer-executable instructions that implement the availability system, which means a computer-readable medium that contains the instructions. In addition, the instructions, data structures, and message structures may be stored or transmitted via a data transmission medium, such as a signal on a communication link.

The availability system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
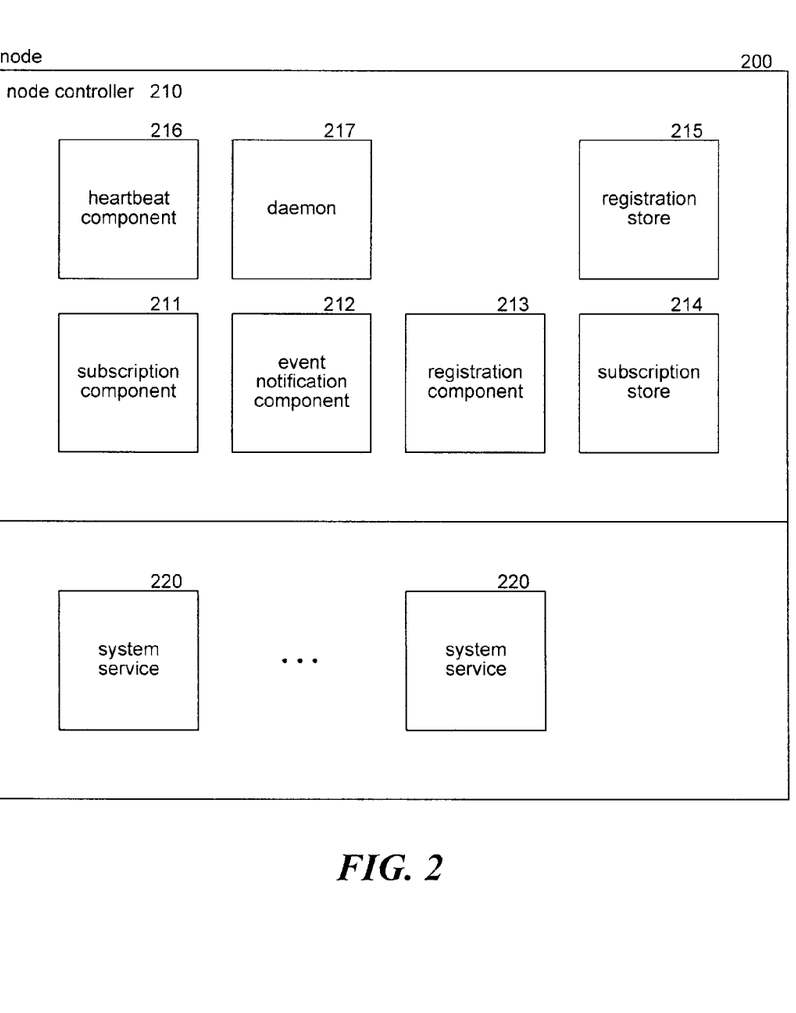
FIG. 2 is a block diagram that illustrates software components of a node of the MPP system in which the availability system operates in some embodiments.

FIG. 2 is a block diagram that illustrates software components of a node of the MPP system in which the availability system operates in some embodiments. The node 200 includes a node controller 210 and various services 220, such as system services and application programs executing on the node. The node controller includes a subscription component 211, an event notification component 212, a registration component 213, a subscription store 214, a registration store 215, a heartbeat component 216, and a daemon 217. The subscription component receives subscription requests from services executing on the node, stores an indication of the subscription requests in the subscription store, and forwards the subscription requests to the parent controller, which in the case of a node controller is a module controller. The event notification component receives the event notifications from the parent controller and from the services executing on the node. The event notification component forwards event notifications received from a service to its parent controller and sends event notifications received from its parent to services. The node controller may also subscribe to receive event notifications for its own use. The node controller may directly send event notifications received from a service or that it generates to the services executing on the node that have subscribed to those events. The registration component receives registration requests from services to monitor the availability of the services. The registration component stores registration information in the registration store. A service that has registered to have its heartbeat monitored invokes the heartbeat component to provide a heartbeat notification to the node controller. A service may also provide a heartbeat notification by incrementing a memory location that is accessible to the node controller. The daemon monitors the execution of the registered services to identify when a service becomes unavailable such as when the heartbeat notifications have stopped.

Figure 3:
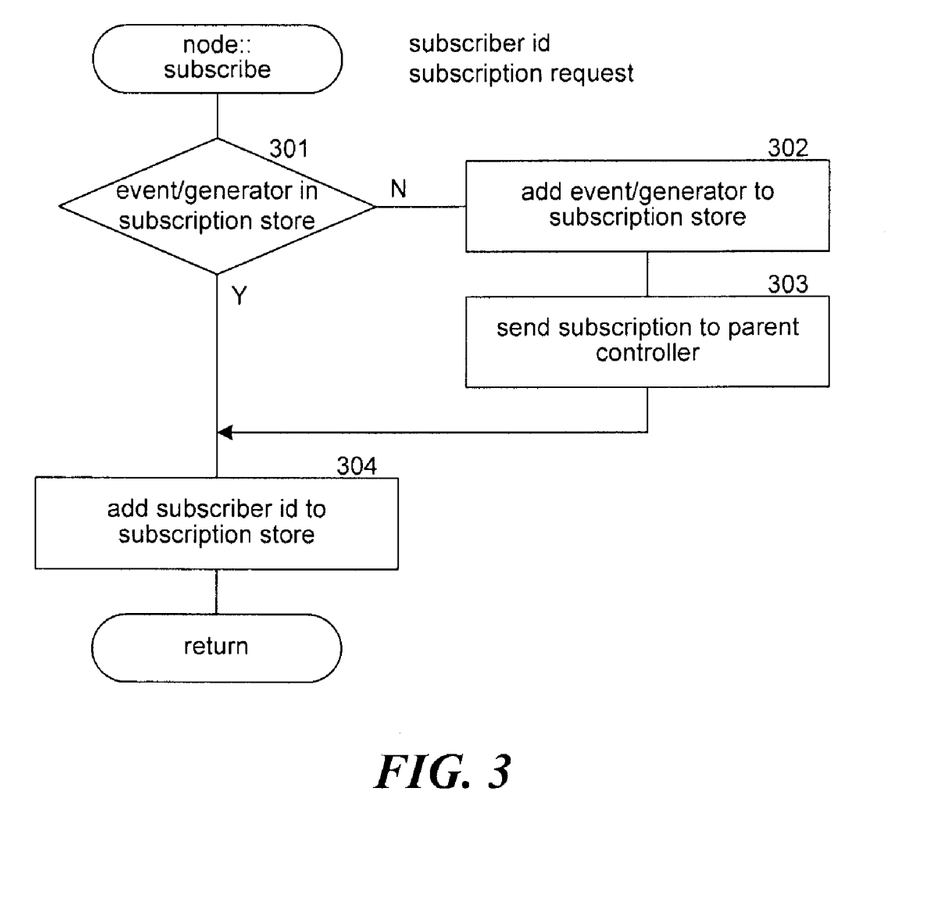
FIG. 3 is a flow diagram that illustrates the processing of a subscribe software component of the subscription component of a node controller in some embodiments.

FIG. 3 is a flow diagram that illustrates the processing of a subscribe software component of the subscription component of a node controller in some embodiments. The component is passed an identifier of the subscriber and the subscription request that includes an event type and a generator combination. In decision block 301, if the event type and generator combination are already in the subscription store, then the component continues at block 304, else the component continues at block 302. In block 302, the component adds the event type and a generator combination to the subscription store as an entry. In block 303, the component sends the subscription request to the parent controller. In block 304, the component adds a subscriber identifier to the subscription store to be associated with the event type and generator combination. An entry thus identifies an event type and generator combination and the identity of each subscriber. The component then returns.

Figure 4:
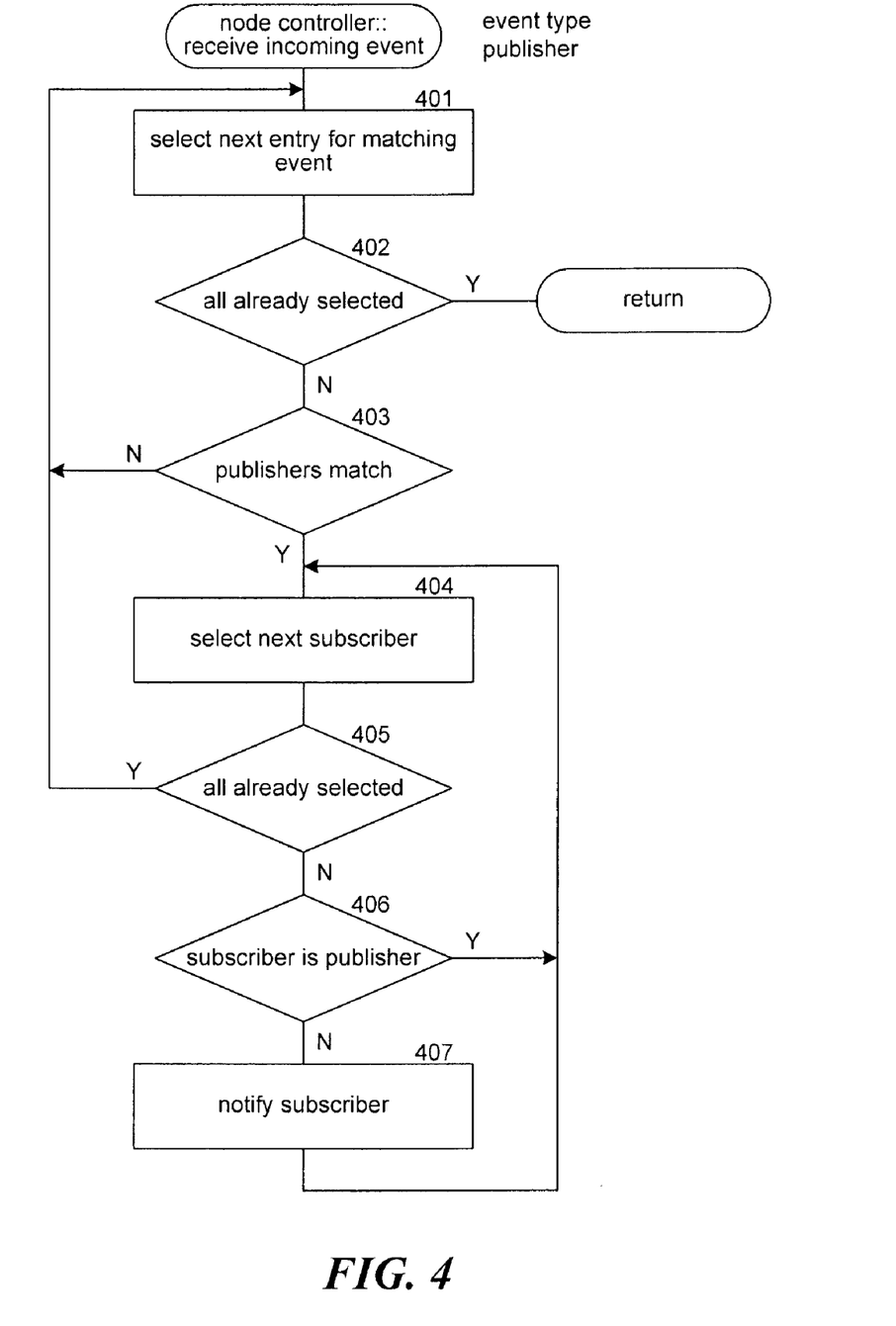
FIG. 4 is a flow diagram that illustrates the processing of a receive incoming event software component of an event notification component of a node controller in some embodiments.

FIG. 4 is a flow diagram that illustrates the processing of a receive incoming event software component of an event notification component of a node controller in some embodiments. The component is passed an event notification that indicates the event type and publisher of the event. The component may be invoked when an event notification is received from a parent controller or from a service executing on the node, or when the node controller generates an event notification itself. In blocks 401-407, the component loops sending the event to subscribers indicated in the subscription store. In block 401, the component selects the next entry of the subscription store that matches the event type. In decision block 402, if all the entries have already been selected, then the component returns, else the component continues at block 403. In decision block 403, if the publisher matches a generator for the entry, then the component continues at block 404, else the component loops to block 401 to select the next entry. A generator may specify a pattern, and a match occurs when the publisher's identifier matches the pattern. In blocks 404-407, the component loops sending an event notification to the subscribers for the event type and generator combination. In block 404, the component selects the next subscriber for the event type and generator combination. In decision block 405, if all such subscribers have already been selected, then the component loops to block 401 to select the next entry of the subscription store, else the component continues at block 406. In decision block 406, if the subscriber is the publisher of the event notification, then the component does not notify the subscriber and loops to block 404 to select the next subscriber, else the component continues at block 407. In block 407, the component notifies the selected subscriber by sending the event notification and then loops to block 404 to select the next subscriber.

Figure 5:
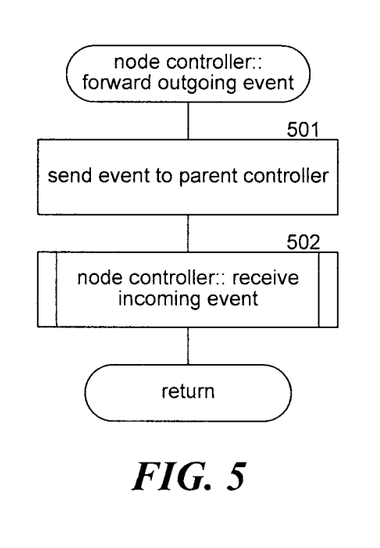
FIG. 5 is a flow diagram that illustrates the processing of a forward outgoing event software component of the event notification component of a node controller in some embodiments.

FIG. 5 is a flow diagram that illustrates the processing of a forward outgoing event software component of the event notification component of a node controller in some embodiments. The component is passed an event notification that indicates the event type and publisher of the event. In block 501, the component sends the event notification to its parent controller. In block 502, the component invokes the receive incoming event software component of the node controller to send the event to any services of the node that have subscribed to receive that event. The component then returns.

Figure 6:
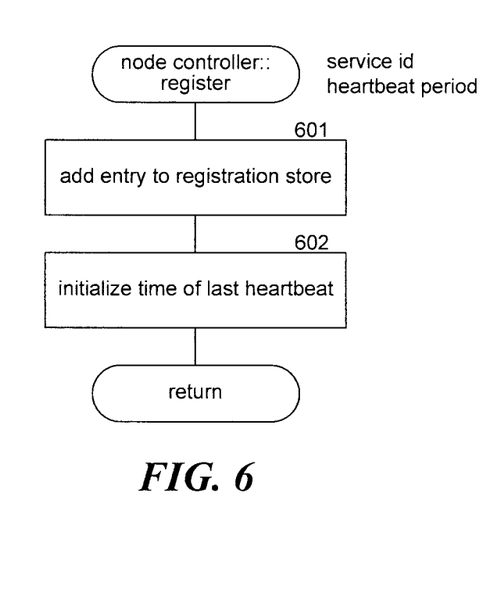
FIG. 6 is a flow diagram that illustrates the processing of a register software component of a node controller in some embodiments.

FIG. 6 is a flow diagram that illustrates the processing of a register software component of a node controller in some embodiments. The component is passed an identifier of a service and an indication of the heartbeat period for that service. In block 601, the component adds an entry to the registration store indicating the service identifier and the heartbeat. In block 602, the component initializes a time of last heartbeat for that entry and then returns.

Figure 7:
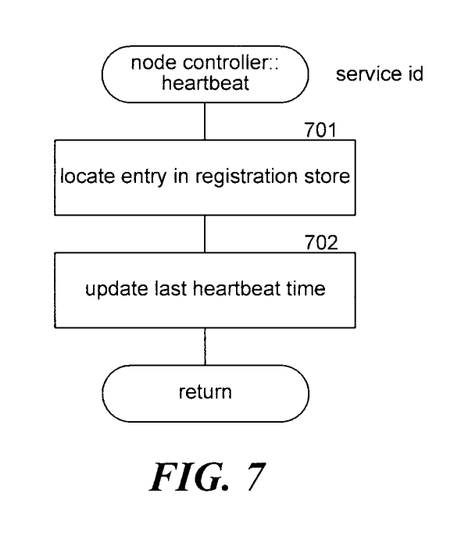
FIG. 7 is a flow diagram that illustrates the processing of a heartbeat software component of the node controller in some embodiments.

FIG. 7 is a flow diagram that illustrates the processing of a heartbeat software component of the node controller in some embodiments. The component is invoked when a service provides a heartbeat to the node controller and is passed the service identifier. In block 701, the component locates the entry in the registration store for the identified service. In block 702, the component updates the last heartbeat time for that entry and then returns.

Figure 8:
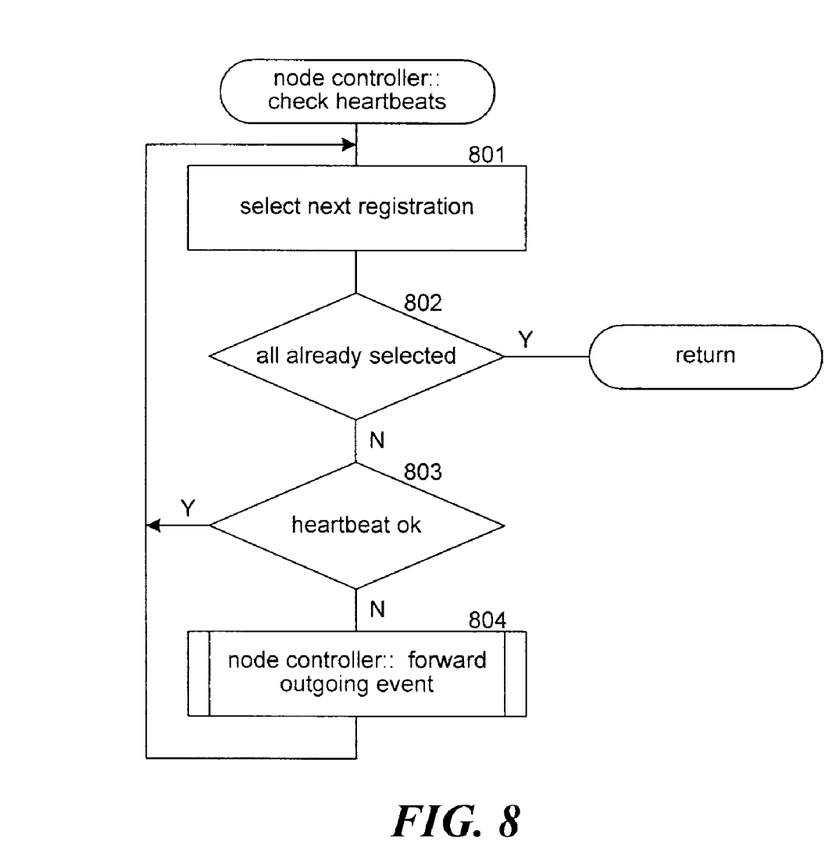
FIG. 8 is a flow diagram that illustrates the processing of a check heartbeats software component of a node controller in some embodiments.

FIG. 8 is a flow diagram that illustrates the processing of a check heartbeats software component of a node controller in some embodiments. This component may be part of the daemon and be executed on a periodic basis to check heartbeats of the registered services. In block 801, the component selects the next registration from the registration store. In decision block 802, if all the registrations have already been selected, then the component returns, else the component continues at block 803. In decision block 803, if the last heartbeat time of the selected registration is within its heartbeat period, then the component loops to block 801 to select the next registration, else the component continues at block 804. In block 804, the component invokes the forward outgoing event software component of the node controller to generate an event to report the failure of the service that did not provide a heartbeat. The component then loops to block 801 to select the next registration.

Figure 9:
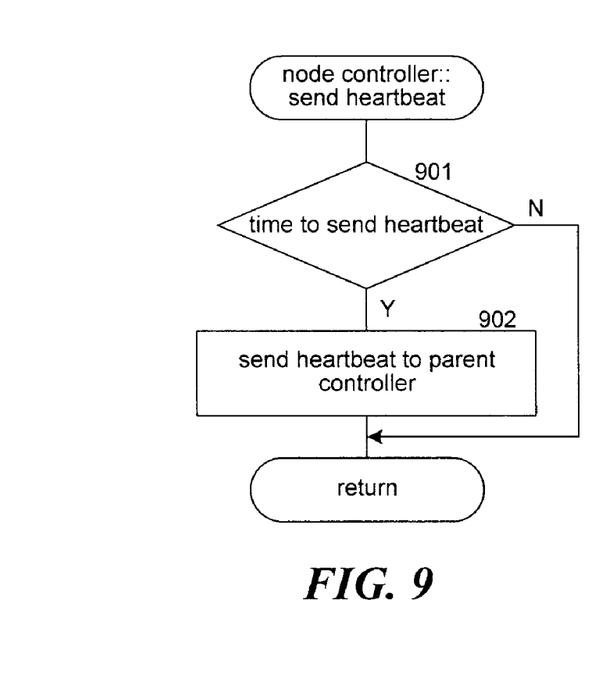
FIG. 9 is a flow diagram that illustrates the processing of a send heartbeat software component of a node controller in some embodiments.

FIG. 9 is a flow diagram that illustrates the processing of a send heartbeat software component of a node controller in some embodiments. This component may be part of the daemon and be executed on a periodic basis to send heartbeats. In decision block 901, if it is time for the node controller to send its own heartbeat, then the component continues at block 902, else the component returns. In block 902, the component sends a heartbeat notification to its parent controller and then returns. In one embodiment, the heartbeat notifications that are sent from controller to controller may be implemented as event notifications or implemented using a separate mechanism.

FIGS. 3-5 are illustrated as being part of a node controller. Each controller of the controller hierarchy has similar functionality for processing subscription requests and event notifications. Each controller also has a heartbeat notification component for checking the heartbeats of child controllers in much the same way as a node controller checks for the heartbeats of registered services. Each controller may have special-purpose software components for performing its monitoring. The node controllers provide special-purpose monitoring for services that execute on a node. Other controllers may provide special-purpose monitoring of associated hardware such as for checking the cooling system of a cabinet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the controllers may include a component to cancel subscription requests or place time limits on subscriptions. The subscription of a service may be canceled by each controller upon receiving notification that the service has failed or terminated in some other way. Since each ancestor controller receives all subscription requests and event notifications of its descendent controllers, a controller can remove the subscription for subscribers that have terminated. A restarted service in such a case would need to resubscribe to receive event notifications. Accordingly, the invention is not limited except as by the appended claims.

We claim:

1. A method in a hierarchy of controllers of a computing system for providing event notifications, a first controller having a child controller and a parent controller, the method comprising:
   receiving at the first controller a subscription from the child controller, the subscription identifying an event type and a generator, the generator identifying publishers to which the child controller is subscribing;
   storing in a subscription store an indication that the subscription has been received from the child controller;
   when the parent controller has not yet been notified of a subscription with a matching event type and generator as indicated by the subscription store, sending the subscription to the parent controller; and
   when the parent controller has already been notified of a subscription with a matching event type and generator as indicated by the subscription store, suppressing the sending of the subscription to the parent controller.

2. The method of claim 1 including:
   receiving an event notification from a publishing child controller of the first controller, the event notification specifying an event type and a publisher; and
   after receiving the event notification,
      forwarding the event notification to the parent controller; and
      when a sibling child controller of the publishing child controller has subscribed to receive events of the event type of the event notification and the publisher matches the generator of the subscription, sending the event notification to the sibling child controller.

3. The method of claim 1 including:
   receiving at the first controller an event notification from a second controller, the event notification specifying an event type and a publisher; and
   after receiving the event notification, when a child controller has subscribed to receive events of the event type of the event notification and the publisher of the event matches the generator of the subscription, sending the event notification to the child controller.

4. The method of claim 1 wherein a child controller executes on a node and receives subscriptions from services executing on the node.

5. The method of claim 1 wherein a child controller executes on a node and publishes events relating to services executing on the node.

6. The method of claim 1 including:
receiving at the first controller heartbeat notifications from child controllers; and
when a heartbeat notification is not received from a child controller as expected, sending an event notification to the parent controller.

7. The method of claim 1 wherein controllers without child controllers execute on nodes for executing services.

8. The method of claim 1 wherein nodes communicate via an interconnect mechanism and the controllers execute on the nodes and communicate via a mechanism that is out-of-band from the interconnect mechanism.

9. The method of claim 1 wherein the first controller transmits events received from child controllers to its parent controller and transmits events received from its parent controller to its child controllers.

10. The method of claim 9 including when a root controller receives an event notification, logging the event notification.

11. The method of claim 1 wherein the first controller has a plurality of child controllers and including:
receiving at the first controller an event notification from a publishing child controller that is a child controller of the first controller, the event notification from the publishing child controller specifying an event type and a publisher;
after receiving the event notification from the publishing child controller, forwarding from the first controller to the parent controller the event notification received from the publishing child controller; and
when a sibling child controller of the publishing child controller has subscribed to receive events of the event type of the event notification received from the publishing child controller and the publisher matches the generator of the subscription, sending from the first controller to the sibling child controller the event notification received from the publishing child controller, the sibling child controller being a child controller of the first controller;
receiving at the first controller an event notification from the parent controller;
after receiving the event notification from the parent controller, when a child controller of the first controller has subscribed to receive events of the event type of the event notification received from the parent controller and the publisher of the event matches the generator of the subscription, sending from the first controller to that child controller the event notification received from the parent controller;
receiving at the first controller heartbeat notifications from child controllers; and
when a heartbeat notification is not received from a child controller as expected, sending from the first controller to the parent controller an event notification.

12. The method of claim 1 wherein the parent controller includes a central processing unit and a memory.

13. A collection of controllers for distributing event notifications relating to management of a network of nodes for performing computations, comprising:
a hierarchy of controllers with each controller except a root controller having a parent controller and each controller except leaf controllers having child controllers, wherein each controller is adapted to receive subscriptions to events from child controllers, to receive event notifications from its parent controller and send the event notifications to child controllers according to the subscriptions, and to receive event notifications from child controllers and forward the event notifications to its parent controller, wherein at least one controller includes a central processing unit and a memory.

14. The collection of controllers of claim 13 in which each leaf controller executes on a node that executes services.

15. The collection of controllers of claim 14 in which the services are system services.

16. The collection of controllers of claim 14 wherein the services send subscription requests to the leaf controllers.

17. The collection of controllers of claim 13 wherein each controller receives heartbeat notifications from its child controllers and notifies its parent controller when a heartbeat notification is not received as expected.

18. The collection of controllers of claim 13 wherein when a controller receives an event notification from a child controller, it sends the event notification to sibling child controllers of the child controller without sending the event notification to the child controller from which the event notification was received.

19. The collection of controllers of claim 13 including, when a controller receives a subscription, suppressing the forwarding of the subscription to the parent controller when a matching subscription has already been sent to the parent controller.

20. A computer-readable storage device encoded with instructions for controlling a controller within a hierarchy of controllers to provide event notifications relating to failure of portions of a computing system, the controller having a parent controller and one or more child controllers, by a method comprising:
storing subscriptions received from child controllers, a subscription identifying an event type and a generator, the generator identifying publishers to which the child controller or a descendent is subscribing to receive event notifications of the event type;
notifying the parent controller of the subscription when the parent controller has not previously been notified of such a subscription; and
after receiving an event notification specifying an event type and a publisher,
when the event notification is received from a child controller, forwarding the event notification to the parent controller; and
sending the event notification to child controllers if they have subscribed to receive events of the event type of the event notification and the publisher matches the generator of the subscription.

21. The computer-readable storage device of claim 20 wherein the event notification is not sent to a child controller from which the event notification was received.

22. The computer-readable storage device of claim 20 including:
receiving heartbeat notifications from child controllers; and when a heartbeat notification is not received from a child controller as expected, sending an event notification to the parent controller.

23. The computer-readable storage device of claim 20 wherein controllers without child controllers execute on nodes for executing services.

24. The computer-readable storage device of claim 20 wherein nodes communicate via a primary system network interconnect and the controllers executed on the nodes and communicate via a mechanism that is out-of-band from the primary system network interconnect.

25. The computer-readable storage of claim 20 including, when a root controller receives an event notification, logging the event notification.

* * * * *